United States Patent [19]

Albano et al.

[11] Patent Number: 5,219,964
[45] Date of Patent: Jun. 15, 1993

[54] FLUOROELASTOMERS ENDOWED WITH IMPROVED PROCESSABILITY AND PROCESS FOR PREPARING THEM

[75] Inventors: Margherita Albano; Giulio Brinati, both of Milan; Vincenzo Arcella; Enzo Giannetti, both of Nova, all of Italy

[73] Assignee: Ausimont S.r.l., Milan, Italy

[21] Appl. No.: 925,845

[22] Filed: Aug. 7, 1992

Related U.S. Application Data

[62] Division of Ser. No. 550,308, Jul. 9, 1990.

[30] Foreign Application Priority Data

Jul. 10, 1989 [IT] Italy ............... 41004 A/89

[51] Int. Cl.$^5$ ............... C08F 4/08
[52] U.S. Cl. ............... 526/237; 626/238; 626/247; 626/254; 626/255
[58] Field of Search ............... 526/238, 254, 255, 247, 526/237

[56] References Cited

U.S. PATENT DOCUMENTS

| | | | |
|---|---|---|---|
| 3,467,635 | 9/1969 | Brasen et al. | 526/255 |
| 3,846,383 | 11/1974 | Uyama et al. | 526/238 |
| 4,035,565 | 7/1977 | Apotheker et al. | 526/247 |
| 4,243,770 | 1/1981 | Tatemoto et al. | 525/340 |
| 4,418,186 | 11/1983 | Yamabe et al. | |
| 4,501,869 | 2/1985 | Tatemoto et al. | 525/387 |
| 4,503,206 | 3/1985 | Robinson | 526/255 |
| 4,619,983 | 10/1986 | Yamabe et al. | |
| 4,745,165 | 5/1988 | Arcella et al. | |
| 4,948,853 | 8/1990 | Logothetis | 526/206 |
| 5,032,655 | 7/1991 | Moore | 526/247 |
| 5,037,921 | 8/1991 | Carlson | 526/247 |
| 5,102,965 | 4/1992 | Carlson | 526/206 |
| 5,153,272 | 10/1992 | Chiodini et al. | 525/387 |

FOREIGN PATENT DOCUMENTS

| | | |
|---|---|---|
| 027721 | 4/1981 | European Pat. Off. . |
| 055407 | 12/1981 | European Pat. Off. . |
| 153848 | 9/1985 | European Pat. Off. . |
| 211251 | 2/1987 | European Pat. Off. . |
| 1495205 | 3/1969 | Fed. Rep. of Germany . |

OTHER PUBLICATIONS

PTO Form 892 dated Aug. 19, 1991.

Primary Examiner—Christopher Henderson
Assistant Examiner—N. Sarofim
Attorney, Agent, or Firm—Morgan & Finnegan

[57] ABSTRACT

Fluoroelastomers characterized by the presence of iodine or bromine atoms at the end of the polymeric chain in an amount equal to or lower than 1 iodine or bromine atom per polymeric chain, and by a bromine content in the chain ranging from 0.05 to 2% by weight referred to the total weight of the monomeric units.

Said fluoroelastomers exhibit improved characteristics of processability, particularly as regards the utilization in injection molding processes and the detaching from the molds, as well as of stability to heat.

A process for preparing fluoroelastomers containing iodine or bromine atoms at the ends of the polymeric chain, in an amount equal to or lower than 1 iodine or bromine atom per polymeric chain, which process comprises polymerizing mixes of fluorinated monomers (VDF, TFE, HFP, FVE) in bulk, in suspension, in aqueous emulsion, or in solution of organic solvents by means of radical starters, in the presence of compounds capable of providing $I^-$ or $Br^-$ ions in the polymerization medium and conditions.

5 Claims, No Drawings

FLUOROELASTOMERS ENDOWED WITH IMPROVED PROCESSABILITY AND PROCESS FOR PREPARING THEM

This is a divisional of co-pending application Ser. No. 07/550,308 filed Jul. 9, 1990, now allowed.

DESCRIPTION OF THE INVENTION

The present invention relates to new elastomeric fluorinated polymers endowed with improved processability characteristics, as well as to the process for preparing them.

As is known, the elastomeric fluorinated copolymers, in particular the ones based on vinylidene fluoride (VDF), hexafluoropropene (HFP) and on other monomers such as tetrafluoroethylene (TFE) and fluorinated vinylethers (FVE), have a wide applicative field thanks to the properties possessed by them in the vulcanized state, such as stability to heat, to the atmospheric and chemical agents in general, and to sunlight. Said polymers are prevailingly prepared by copolymerization of the above-mentioned fluorinated monomers, in proper ratios, in the presence of radical starters of the peroxide type, thermally activated or activated by means of redox systems.

A requirement of the industry which prepares and uses fluoroelastomeric polymers is that such type of products should be promptly and economically vulcanizable. In particular there are required: high vulcanization rates, a high increase in the torque value during the ODR vulcanization test, an easy detaching of the vulcanized products from the molds, low compression set values of the vulcanizates and, last, sufficiently low viscosity values of the vulcanization mixes to permit an easy use of said mixes mainly in the injection molding processes.

Several attempts have been made in the techniques in order to obtain satisfactory fluoroelastomers under these regards. From U.S. Pat. No. 4,035,565 fluorinated copolymers are known, which comprise up to 3% by moles of units deriving from bromotrifluoroethylene or from 4-bromo-3,3,4,4-tetrafluorobutene-1, and based on monomeric units deriving from combinations of tetrafluoroethylene, with $C_2$–$C_4$ olefins and optionally vinylidene fluoride, or from combinations of tetrafluoroethylene with perfluoroalkyl-perfluorovinylethers, or of perfluoroalkyl-perfluorovinylethers with fluorinated olefins.

Such copolymers exhibit an excellent thermal stability, but are affected by the drawback of being processable with difficulty due to the adhesion and to the residues that they leave on the surfaces of the vulcanization molds.

French patent No. 2,386,561 discloses easily vulcanizable fluorinated copolymers, consisting of monomeric units deriving from vinylidene fluoride and optionally of one or more fluoroolefins, comprising at least a iodine atom per polymeric chain, the iodine atom being arranged in the end position of the chain and being derived from iodidated chain transferors $(RI)_x$, and furthermore comprising, in the polymeric chain, fluorohydrocarbon residues R deriving from the abovesaid transferors.

Said copolymers are prepared by (co)polymerization of proper fluorinated monomers, in the presence of the above-mentioned iodinated transferors and of a source of free radicals, such as light radiations, peroxides, etc.

The products so obtained are promptly vulcanizable, do not exhibit phenomena of adhesion to the molds during vulcanization, but they possess a low thermal stability.

Thus, one of the objects of the present invention consists in easily vulcanizable elastomeric fluorinated copolymers endowed with improved processability characteristics (especially in the injection molding processes), which do not give rise to phenomena of adhesion to the molds during the molding processes both in a press and by injection, and which possess at the same time a good stability to heat.

Such fluoroelastomeric copolymers comprise monomeric units deriving from vinylidene fluoride and/or tetrafluoroethylene, said units being possibly combined with monomeric units deriving from hexafluoropropene and/or perfluoroalkyl-perfluorovinylethers, and are characterized in that they contain, in the end position of the polymeric chain, a halogen selected from iodine and bromine, in an amount equal to or lower than one atom of such halogen per polymeric chain, and are further characterized by a content of non-terminal bromine, deriving from brominated monomeric units in the polymeric chain, ranging from 0.05 to 2% by weight referred to the total weight of the monomeric units present therein.

Monomeric units deriving from ethylene and/or propylene and/or butene-1 and/or isobutylene can be present in such copolymers in amounts up to 40% by moles with respect to the total moles of the fluorinated monomeric units.

The content of bromine or iodine arranged in end position of the polymeric chain generally ranges from 0.001 to 1% by weight, but preferably from 0.04 to 0.6% by weight calculated on the total weight of the monomeric units which are present in the polymer.

Preferably, iodine is the halogen which is present in end position of the polymeric chain.

Among the brominated monomeric units present in the copolymers there can be cited the ones deriving from polymerizable brominated compounds, such as the compounds of general formula $CF_2$—$Br$—$Rf$—$O$—$CF$=$CF_2$, where Rf is a perfluorinated alkylene containing from 1 to 9 carbon atoms, or from brominated olefins such as bromotrifluoroethylene, 4-bromo-3,3,4,4-tetrafluorobutene-1 and in general the olefins wherein at least a hydrogen atom has been substituted by a bromine atom, and optionally one or more of the remaining hydrogen atoms have been substituted by another halogen atom, preferably fluorine. A few olefins of this type are preparable according to methods of the art, for example as is described by Tarrant and Tunden in J. Org. Chem. 34, 864 (1969) and by Fainberg and Miller in JACS 79, 4170 (1957). Other brominated olefins which are suited to copolymerize and to form the brominated monomeric units contained in the products of the invention are vinyl bromide, 1-bromo-2,2-difluoroethylene, perfluoroallylbromide, 4-bromo-1,1,2-trifluorobutene, 4-bromo-1,1,3,3,4,4-hexafluorobutene, 4-bromo-3-chloro-1,1,3,4,4-pentafluorobutene, 6-bromo-5,5,6,6-tetrafluorohexene, 4-bromo-perfluorobutene-1 and 3,3-difluoroallylbromide.

Among the monomeric perfluoroalkylvinylether units the preferred ones are those deriving from perfluoroalkylvinylethers of general formula $CF_2$=$CF$—$O$—$Rf$, where Rf is a perfluoroalkyl radical containing from 1 to 5 carbon atoms, and preferably from 1 to 3 carbon atoms.

The fluoroelastomeric copolymers of the present invention give rise—the qualitative and quantitative composition being equal—to vulcanization mixes endowed with a better processability in the molten state as compared with the corresponding bromine-modified copolymers of U.S. Pat. No. 4,035,565, exhibit a detachability from the vulcanization molds at least equal to the one of the polymers modified with terminal iodine described in French patent No. 2,386,561, and possess, at the same time, higher thermal stability characteristics than the ones of the products of said French patent.

The fluoroelastomeric compounds according to the present invention are furthermore substantially free from gels (gel content lower than 1% by weight).

Furthermore, said copolymers generally exhibit modulus values, after vulcanization under standard conditions and with equal vulcanization formulation, which are higher than the ones of the only brominated copolymers in the chain or of the only iodinated copolymers with more than one end iodine atom.

Another object of the present invention is to provide a process for preparing elastomeric fluorinated copolymers containing, in the end position of the polymeric chain, iodine or bromine in amounts equal to or lower than one atom of said halogen per polymeric chain, which process comprises polymerizing, in an aqueous emulsion, mixes of monomers selected from vinylidene fluoride, tetrafluoroethylene, hexafluoropropene and perfluoroalkyl-perfluorovinylethers, by means of radical starters and in the presence of one or more compounds capable of providing $I^-$ or $Br^-$ ions in the polymerization medium and conditions. Among the compounds endowed with such characteristics, and therefore utilizable in the process of the invention, there are cited, in particular, hydroiodic (HI) and hydrobromic (HBr) acids, iodides and bromides of the metals belonging to groups I and II, A and B of the Periodic System, such as e.g. Li, Na, K, Rb, Cs, Be, Mg, Ca, Sr, Ba, Cu, Ag, Zn, Cd, as well as the transition metals, such as e.g. Fe, Co, Ni, Ru, Rh, Pd, Pt, or belonging to groups III and IV B of the Periodic System, such as e.g. Al, Ga, Sn, Pb.

The iodides of the alkaline or alkaline-earth metals are preferably used. The amount of such compounds capable of providing $I^-$ or $Br^-$ ions, to be used in the process of the invention, is preferably higher than the amount which corresponds to the amount of iodine or bromine which are combined in the end position of the polymeric chain in the final polymer.

In practice it is operated with amounts of such compounds higher by 30% by weight than the one corresponding to the amount of iodine or bromine which are present in end position in the produced polymer.

In addition to the above-mentioned fluorinated monomers, polymerizable brominated monomers and/or olefinic monomers, in particular ethylene and/or propylene and/or butene-1, can be present in the polymerization.

The olefin monomers can be present in amounts up to 40% by moles with respect to the total moles of fluorinated monomers present in the polymerization. As brominated monomers, the ones cited hereinbefore can be used.

The process according to the invention permits to prepare fluoroelastomers containing, in the end position of the polymeric chain, iodine or bromine atoms in an amount not higher than one atom per polymeric chain, and preferably in an amount ranging from 0.1 to 0.9 atoms per polymeric chain.

In said fluoroelastomers, the second end of the polymeric chain can exhibit an end group deriving from the decomposition of the polymerization starter or from a possible reaction thereof with the polymerization medium. For example, when a persulphate is utilized as a polymerization starter, such end group can consist of —OH or —COOH—.

Alternatively, the other end group can derive from a proper and known chain transferor introduced into the reaction medium in order to regulate the polymer molecular weight, such as e.g. ethylacetate, chloroform, etc.

The copolymerization reaction can be carried out by means of known methods, such as, for example, the ones described in Kirk Othmer, Encyclopedia of Chemical Technology, vol. 8, pages 500 et. seq., 1979. Polymerization methods comprise bulk polymerization or polymerization in solution of organic solvents, or in emulsion or suspension in water. Useful polymerization radical starters are, for example, organic peroxides such as ammonium or potassium persulphates, redox systems such as persulphate-bisulphite and ferropersulphate, organic peroxides such as benzoyl peroxide, dicumyl peroxide, bis(4-t.butyl-cyclohexyl)peroxydicarbonate, di-t. butyl-peroxide, diisopropylperoxidicarbonate; diethylhexylperoxidicarbonate, acetyl-cyclohexyl-sulphonyl peroxide, t.butyl-peroxypivalate, 2,4-dichloro-benzoyl peroxide, isobutyl peroxide, octanoyl peroxide, fluorinated peroxides and peranhydrides.

Preferably it is operated in an aqueous emulsion. Any type of (fluorinated) emulsifier can be used in the process of the present invention; an example are the fluorinated carboxylic acid soaps.

The polymerization reaction can be conducted at temperatures ranging from 25° to 150° C., under pressures up to 10 MPa.

Among the elastomeric fluorinated copolymers forming the object of the present invention there can be cited, for merely indicative purposes, the ones consisting of the combination of the following monomeric units, in the mole-% indicated hereinafter:

| I) | vinylidene fluoride (VDF) | 35–80 |
|---|---|---|
|  | hexafluoropropene (HFP) | 10–35 |
|  | tetrafluoroethylene (TFE) | 0–30 |
|  | perfluoroalkylvinylether (FVE) | 0–25 |
|  | (where the alkyl can be constituted by 1-3 carbon atoms) | |
| II) | VDF | 35–80 |
|  | FVE | 10–35 |
|  | TFE | 0–30 |
| III) | TFE | 53–80 |
|  | FVE | 20–47 |
| IV) | TFE | 30–65 |
|  | hydrogenated olefin containing from 2 to 4 carbon atoms | 20–55 |
|  | VDF | 0–40 |

EXAMPLES

The following examples are given to better illustrate the invention without being a limitation thereof.

EXAMPLES

Polymerization method and characterization of the copolymers

There was utilized a 5-liter reactor equipped with stirrer, in which vacuum had been created. Into the reactor there were charged 3,500 g of $H_2O$, optionally a ionic surfactant such as ammonium perfluorooctanoate, and acidity buffer consisting of potassium metabisulphite in such amount as to maintain the pH value always in a range of from 2 to 6 and, finally, all or part of the determined amount of the compound capable of providing $I^-$ or $Br^-$ ions.

Pressure was generated in the reactor by introducing the monomer mixture, then, after having brought the reactor to the polymerization temperature, the radical starter, consisting of an aqueous solution of $(NH_4)_2S_2O_8$ having a concentration of 150 g of persulphate/liter of $H_2O$, was added.

During the polymerization, additions of starter and/or of iodine or bromine ions generator compound were made or not, as indicated in the examples.

During the polymerization, the pressure was maintained constant by feeding the monomers in the indicated molar ratios.

On conclusion of the reaction, which corresponded to the desired polymer conversion, the emulsion was discharged, it was coagulated by means of the usual methods, for example by addition of $Al_2(SO_4)_3$ or of acids, the polymer was separated, washed with water and dried in an air-circulation oven until obtaining a moisture content in the polymer below 1%.

The polymer so obtained was mixed in an open roller mixer with the conventional vulcanization ingredients, in the weight percentages indicated hereinafter:

| polymer | 100 |
|---|---|
| Luperco 101 XL | 3 |
| triallylisocyanurate | 4 |
| PbO | 3 |
| carbon black (MT Black) | 30 |

On the mix, the following measurements were carried out:
a) Mooney viscosity 1+10 at 121° C. (ASTM 1646/82)
b) Mooney viscosity, scorch at 135° C. (ASTM 1646/82)
c) ODR (oscillating disk rheometer) (ASTM D 2084/81) conducted at 180° C., arc±3.

The mix was then vulcanized in a press at 170° C. for 10 minutes, according to ASTM D 412/80 standards.

On the vulcanizate, the following determinations were carried out:
d) measurement of the following mechanical properties:
 tensile modulus (M100)
 tensile strength (T.S.)
 elongation at break (E.B.)
 Shore hardness A (Hard.);
e) measurement of the same mechanical properties after post-treatment of the vulcanizate at 250° C., by raising up to 8 hours and permanent for 24 hours at 250° C. (ASTM D 412/80);
f) detachability from the mold according to the modalities indicated hereinafter:

The mix was vulcanized in a press at 170° C. for 10 minutes and the piece was removed from the mold at a temperature of 170° C.

The mold soiling was evaluated on a mold having 7 circular cavities (diameter=40 mm, height=3 mm) by repeating the moldings of all the mixes being tested until evidencing aspect differences on the bottom surfaces of the circular cavities understood as brownings, i.e. darker opalescences.

For each mix, 80 moldings were carried out and the evaluation scale was as follows:
10. If no brownings are present after 80 moldings.
9. If brownings are present after 70 moldings.
8. If brownings are present after 62 moldings.
7. If brownings are present after 55 moldings.
6. If brownings are present after 49 moldings.
5. If brownings are present after 42 moldings.
4. If brownings are present after 35 moldings.
3. If brownings are present after 28 moldings.
2. If brownings are present after 21 moldings.
1. If brownings are present after 14 moldings.
0. If brownings are present after 7 moldings.
g) Thermal stability on the vulcanized test-piece post-treated at 275° C. for 70 hours (ASTM D 573/81 (E145)).
h) Compression set at 200° C. for 70 hours after post-treatment at 250° C. by raising up to 8 hours and permanent for 24 hours (ASTM D 1414/78).

EXAMPLE 1

Molar per cent composition of the feeding monomer mix:

| HFP | 25 |
|---|---|
| TFE | 25 |
| VDF | 50 |
| and furthermore KI = | 4.2 g |
| starting $(NH_4)_2S_2O_8$ = | 6.9 g. |

During polymerization, which lasted 129 minutes, the reactor was fed with 0.78 g of starter each 10 minutes and with KI in an amount of 0.42 g each 10% of conversion of the monomers, as well as with $CF_2\!=\!CF\!-\!O\!-\!CF_2\!-\!CF_2\!-\!Br$ in an amount of 1.7 g each 5% of conversion of the monomers. Polymerization temperature and pressure were equal to 85° C. and 1.7 MPa, respectively.

There were obtained 1,500 g of a polymer having the following composition (determined by NMR $^{19}F$) in moles-%:

| HFP | 21.4 |
|---|---|
| VDF | 53.8 |
| TFE | 23.9 | the balance to 100 consisting of brominated monomeric units, and containing 0.69% by weight of bromine (determined by fluorescence) calculated on the polymer weight. The polymer had an inherent viscosity equal to 0.42 dl/g.

This copolymer exhibited iodine atoms only in end position at one end of the polymeric chains, in an amount of 0.47 atoms per polymeric chain, and corresponding to 0.14% by weight of iodine referred to the polymer. No gels were practically contained in the copolymer. The above-listed characteristics from (a) to (h) of the vulcanization mix and of the vulcanizate are reported the table.

EXAMPLE 2

It was operated as in example 1, but without feeding the brominated monomer and furthermore by using 5.4 gr of KI.

In the copolymer, the content of iodine in end position was equal to 0.18% by weight, corresponding to 0.52 iodine atoms per polymeric chain. There was no gel content. The characteristics of the vulcanization mix and of the vulcanizate are reported in the table.

EXAMPLE 3

Composition of the fluorinated monomer feeding, in moles-%:

| | |
|---|---|
| VDF | 55 |
| perfluoromethyl-vinylether (PMVE) | 23 |
| TFE | 22 |

The other polymerization conditions were similar to the ones of example 1, with exception of the pressure, which was equal to 1.9 MPa, and the whole amount of KI, which was equal to 3.6 g, and fed in amount of 0.36 g each 10% conversion of the monomer. The resulting polymer had the following composition in per cent by moles:

| | |
|---|---|
| VDF | 58.6 |
| PMVE | 17.8 |
| TFE | 23.6 | with a bromine content in the polymeric chain equal to 0.6% by weight and a iodine content in end position equal to 0.11% by weight, corresponding to 0.65 iodine atoms per polymeric chain. The gel content was equal to 0%.

The characteristics of the vulcanization mixture and of the vulcanizate are reported in the table.

EXAMPLE 4

It was operated as in example 3, using the following fluorinated monomers feeding composition:

| | |
|---|---|
| VDF | 46 |
| HFP | 5 |
| TFE | 26 |
| PMVE | 23 |

The resulting polymer had the following composition in per cent by moles:

| | |
|---|---|
| VDF | 48.4 |
| HFP | 4.5 |
| TFE | 27.4 |
| PMVE | 19.1 | with a bromine content in the chain equal to 0.6% by weight and a iodine content in end position equal to 0.1% by weight, corresponding to 0.6 iodine atoms per polymeric chain. The inherent viscosity was equal to 0.54 dl/g. The gel content was 0%. The characteristics of the mixes and of the vulcanizate are reported in the table.

EXAMPLE 5

It was operated as in example 1, with the exception that the pressure was 2.2 MPa and the amount of the starter was 2.8 g at the beginning and 0.31 g each 10% conversion of the monomers using the following fluorinated monomers feeding composition, in per cent by moles:

| | |
|---|---|
| VDF | 79 |
| HFP | 21 |

The obtained polymer exhibited the following composition in moles-%:

| | |
|---|---|
| VDF | 78.1 |
| HFP | 21.7 | with a bromine content in the chain equal to 0.6% by weight, and a content of iodine in end position equal to 0.12% by weight corresponding to 0.65 iodine atoms per chain. The inherent viscosity was equal to 0.7 dl/g. The gel content was of 0%. The characteristics of the vulcanization mixes and of the vulcanizate are reported in the table.

TABLE

Characteristics of the vulcanization mix and of the vulcanizate

| | | | | | c | | | | | d | | | |
|---|---|---|---|---|---|---|---|---|---|---|---|---|---|
| Examples | a | b* | t min++ (lb. foot) inch | t max+++ (lb. foot) inch | $Ts_2$ (sec) | $Ts_{50}$ (sec) | T'90 | Vmax (lb. foot. inch) sec | M100 (MPa) | T.S. (MPa) | El. (%) | Hard. |
| 1 | 16 | 12 | 4.5 | 77.5 | 60 | 129 | 252 | 1.11 | 5.5 | 14 | 220 | 71 |
| 2* | 15 | — | 1.7 | 11.5 | — | — | — | 0.22 | — | — | — | — |
| 3 | 33 | — | 10 | 93 | 57 | 120 | 235 | 1.28 | 5.5 | 16.7 | 195 | 70 |
| 4 | 56 | — | 7.5 | 80 | 55 | 150 | 288 | 1.4 | 5 | 13.5 | 219 | 66 |
| 5 | 44 | — | 9 | 70 | 60 | — | 223 | 1.3 | 5.5 | 14.5 | 250 | 65 |

*minimum value after 15 minutes = 11' and 54"
++ minimum torque
+++ maximum torque
*no vulcanization occurs

TABLE

Characteristics of the vulcanization mix and of the vulcanizate

| Examples | M100 (MPa) | T.S. (MPa) | Elong. (%) | Hard. | f | ΔM100 (%) | ΔT.S. (%) | ΔEl. (%) | ΔDm (%) | h |
|---|---|---|---|---|---|---|---|---|---|---|
| 1 | 7 | 19 | 200 | 73 | 10 | −52 | −47 | +60 | −5 | 32 |
| 2 | — | — | — | — | — | — | — | — | — | — |
| 3 | 7 | 19 | 186 | 72 | 10 | −70 | −55 | 80 | −7 | 36 |
| 4 | 6.2 | 18.2 | 209 | 71 | 10 | −70 | −78 | 70 | −4 | 34 |
| 5 | 6 | 18 | 230 | 70 | 10 | −21 | −45 | 5 | −1 | 34 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for preparing elastomeric fluorinated copolymers containing, in end position of the polymeric chains, iodine or bromine atoms in amounts equal to or lower than one iodine or bromine atom per polymeric chain, which process comprises polymerizing mixes of monomers selected from vinylidene fluoride, tetrafluoroethylene, hexafluoropropene and perfluoroalkyl-perfluorovinylethers, along with at least one polymerizable brominated monomer by radical starters, in the presence of one or more inorganic compounds capable of providing $I^-$ or $Br^-$ ions in the polymerization medium and conditions.

2. The process according to claim 1, wherein said brominated monomer is in such amount as to provide a polymer containing from 0.05 to 2% by weight of bromine referred to the total weight of the monomeric units.

3. The process according to claim 1, wherein the monomers comprise up to 40% by moles of an olefin selected from ethylene, and propylene and butene-1 and isobutylene, calculated on the moles of fluorinated monomers present therein.

4. The process according to claim 1, wherein the inorganic compounds capable of providing $I^-$ or $Br^-$ ions are iodides of alkaline or alkaline-earth metals.

5. A process for preparing elastomeric fluorinated copolymer macromolecules containing at most one iodine or bromine atom per macromolecule at one end of the macromolecule chain, and free at the other end of said chain from organic groups (fragments) derived from iodinated or brominated organic chain transfers, comprising polymerizing a mixture of monomers selected from vinylidene fluoride, tetrafluoroethylene, hexafluoropropene and perfluoroalkyl-perfluorovinylethers, along with at least one polymerizable brominated monomer in the presence of radical starters and one or more inorganic compounds capable of providing $I^-$ or $Br^-$ ions in the polymerization medium and conditions, wherein the bromine atoms in said copolymer macromolecules are derived from bromine-containing monomeric units in the polymeric chain, in amounts of from 0.05 to 2% by weight with respect to the total weight of the monomeric units.

* * * * *